United States Patent [19]

Schaum et al.

[11] 4,222,703

[45] Sep. 16, 1980

[54] TURBINE ENGINE WITH INDUCED PRE-SWIRL AT COMPRESSOR INLET

[75] Inventors: Hans H. Schaum, St. Bruno; Donald J. Tedstone; Ching-Yee Ma, both of St. Lambert; John J. Sanderson, St. Bruno, all of Canada

[73] Assignee: Pratt & Whitney Aircraft of Canada Limited, Longueuil, Canada

[21] Appl. No.: 860,055

[22] Filed: Dec. 13, 1977

[51] Int. Cl.³ .................. F01D 1/12; F04D 29/54
[52] U.S. Cl. .................................. 415/53 R; 415/115
[58] Field of Search .................. 415/11, 28, 53 R, 59, 415/144, 145, 115, 52, DIG. 1; 239/523, DIG. 1; 60/39.09 D

[56] References Cited

U.S. PATENT DOCUMENTS

| 2,488,783 | 11/1949 | Stalker | 415/DIG. 1 |
| 2,649,278 | 8/1953 | Stalker | 415/DIG. 1 |
| 2,763,427 | 9/1956 | Lindsey | 415/115 |
| 3,029,011 | 4/1962 | Lewis | 415/53 R UX |
| 3,572,960 | 3/1971 | McBride | 415/115 |
| 3,628,880 | 12/1971 | Smuland et al. | 415/115 |
| 3,643,675 | 2/1972 | Wetterstad | 415/DIG. 1 |
| 3,751,909 | 8/1973 | Kohler | 415/144 X |

FOREIGN PATENT DOCUMENTS 779667   7/1957   United Kingdom .................. 415/53 R Primary Examiner—Louis J. Casaregola
Attorney, Agent, or Firm—Swabey, Mitchell, Houle, Marcoux & Sher

[57] ABSTRACT

A method and apparatus for utilizing bleed air taken interstage from a multi-stage compressor and passing the bleed air through hollow engine support struts in the inlet area of the compressor, the struts being formed such that a jet flap will be provided by the bleed air discharging from the strut to induce a pre-swirl in the air drawn into the compressor at low operating modes.

1 Claim, 4 Drawing Figures

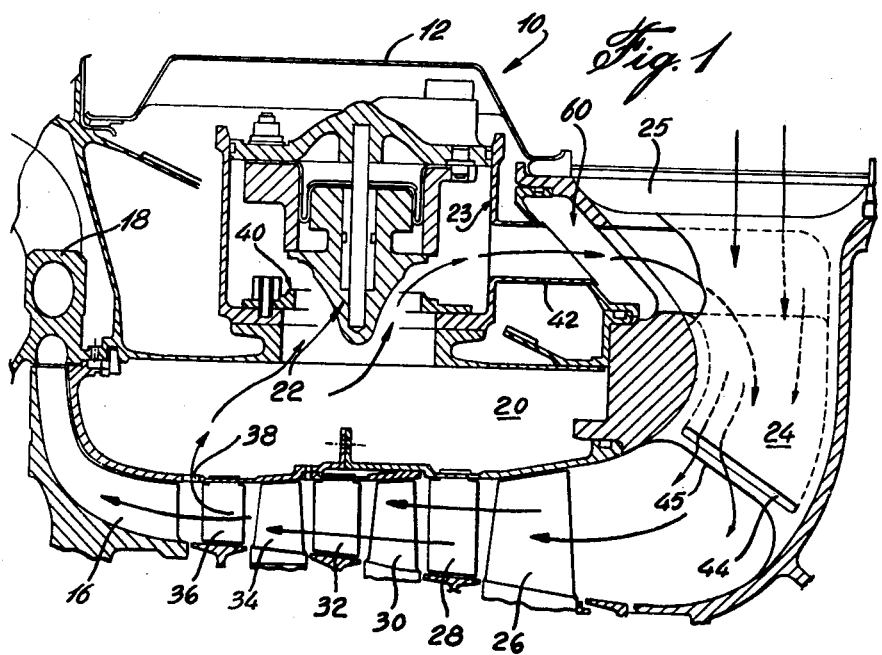
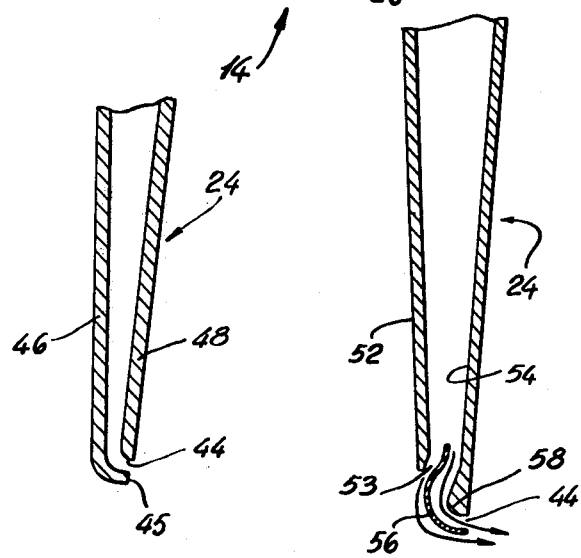

TURBINE ENGINE WITH INDUCED PRE-SWIRL AT COMPRESSOR INLET

BACKGROUND OF THE INVENTION

1. Field of the Invention

The present invention relates to a turbine engine, and particularly to such an engine having a multi-stage compressor with engine support struts in the inlet of the compressor.

2. Description of the Prior Art

It is known that compression ratios in turbine engines being presently made are very high and that compressors in turbine engines are designed to perform best for cruising performance. As a result, there is a greater chance of instability occurring which might result in engine surge at off design modes of operation such as at starting and idling.

In order to overcome such problems, many turbine compressors have provisions for bleeding off air interstage, thereby increasing the stable operating range of the compressor. This bleed air, however, which is normally discharged overboard, contains energy which, of course, is lost. A typical bleed air interstage compressor with a bleed valve is described in U.S. Pat. No 3,360,189, Cook, issued Dec. 26, 1967.

Attempts have also been made to provide pre-swirl to the air as it is being drawn into the compressor during low power operation. These attempts have included the provision of a variable angle intake support strut whereby the struts give a pre-swirl direction to the air as it is being drawn but the angle is reduced as the engine approaches design mode operation. However, any mechanical solution of this type to provide pre-swirl to the air drawn into the compressor renders the structure more complicated, and increases the weight thereof.

Reference is made now to U.S. Pat. No. 3,751,909, Kohler, 1973. In this patent, which refers to a multi-shaft turbo-jet engine, there is mention of bleeding air from the outlet of a compressor stage which passes through a turbine outlet strut and back through a stator vane preceding the compressor stage in question. The apparatus described in the U.S. patent is complex and can relate only to a multi-shaft, multi-compressor turbine engine. The apparatus in Kohler is also used for cooling the hot turbine gas struts by way of drawing air between two compressors and having it pass through the engine strut beyond the turbine. The apparatus in Kohler makes provisions to take air from the exit area of the compressor which is normally not desirable since it represents an unnecessary loss of higher energy air.

SUMMARY OF THE INVENTION

It is an aim of the present invention to provide a simple and practical arrangement for using a portion of the inter-stage bleed air of a single shaft multi-stage compressor by passing the air through a hollow strut preceding the compressor and inducing a pre-swirl in the air drawn into the compressor during low power operation.

An apparatus in accordance with the present invention includes a turbine engine having an axial flow multi-stage compressor with compressor rotors mounted on a single shaft, bleed ports provided in the compressor housing interstage of the compressor, a plenum chamber in which the bleed air from the bleed ports is collected, valve means for selectively passing the bleed air to a plurality of hollow support struts provided in the inlet of the axial flow commpressor, each of the hollow struts being connected to the valve means by conduit means, the strut having a slot therein provided near the trailing edge of the strut such that the bleed air passing through the hollow strut will be emitted at an angle to the air flow thereby creating a swirl in the air flow to the compressor.

A method of recovering energy from interstage compressor bleed air by reusing the bleed air as a pre-swirl in the air drawn to the compressor at low power operation includes the steps of obtaining air bled interstage from the compressor and selectively passed to hollow struts provided in the inlet area of the compressor allowing the air under pressure to discharge as a jet flap in a direction at an angle to the air flow to the compressor, thereby causing a pre-swirl in the air flow.

BRIEF DESCRIPTION OF THE DRAWINGS

The invention will now be described with reference to the accompanying drawings, in which:

FIG. 1 is a fragmentary axial cross-section of a detail of a typical turbine engine compressor;

FIG. 2 is an enlarged fragmentary cross-section of a further embodiment of the details shown in FIG. 1;

FIG. 3 is a similar view to FIG. 2 showing a still further embodiment thereof.

DESCRIPTION OF THE PREFERRED EMBODIMENT

Figure 4:
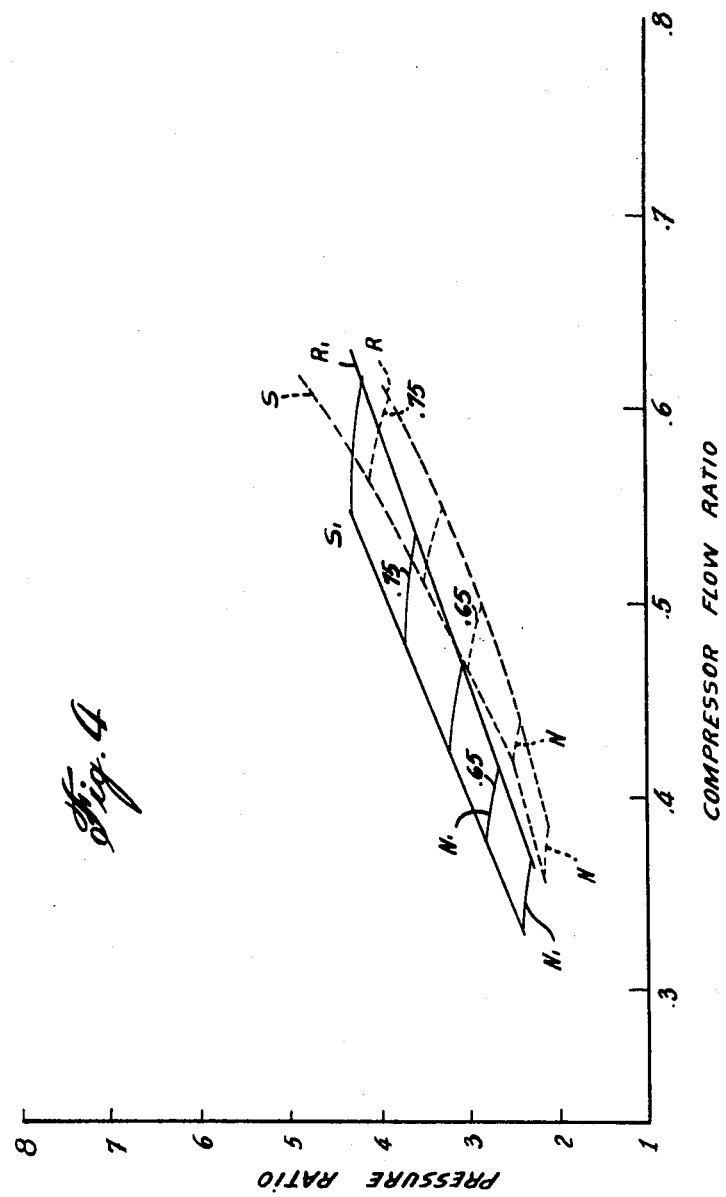
FIG. 4 is a graph illustrating stable performance ranges of a compressor of the embodiment shown in FIG. 1.

Referring now to the drawings and particularly to FIG. 1, there is shown a fragment of the compressor section of a typical turbine engine 10.

The engine 10 includes an outer casing 12 surrounding a multi-stage, single shaft compressor 14. As part of the compressor, a centrifugal impeller 16 is also mounted on the same shaft (not shown). A diffuser 18 is concentric with the outlet of the impeller 16. An annular chamber 20, which might be referred to as a plenum chamber 20, surrounds the compressor 14. One or more bleed valves 22 will control the flow of air from the plenum chamber 20 to the hollow struts 24. A plurality of radially and axially extending engine support struts 24 are normally provided in the inlet case 25. The struts 24 in the present invention are hollow as will be described later. The compressor 14 in this particular embodiment includes a leading rotor 26 having a plurality of blades mounted to the shaft (not shown) with subsequent rotor stages represented by the rotor blades 30 and 34. Interstage of the rotor blades 26, 30 and 34, are the stator vanes 28 and 32 and finally between the rotor 34 and the impeller 16 is a plurality of stator vanes 36.

A plurality of bleed parts 38 would be provided in the present embodiment behind the stator vanes 36 to bleed air from the compressor into the plenum, partidularly at low power modes. The bleed ports 38 could be provided between other stages of the compressor, but preferably not at the exit of the compressor that is beyond the diffuser 18 since considerable work has been done to the air by that stage.

A valve seat 40 is provided with each valve 22. The valve 22 and valve seat 40 are substantially as described in U.S. Pat. No. 3,360,189. In this patent, the valve controls bleed air from the compressor to allow the bleed air to discharge overboard the engine. In the present case, the valve chamber 23 communicates with a plurality of conduits 42 which pass the pressurized bleed air to each individual, hollowed-out, support strut 24 via a communicating volute 60 to equalize flow distribution.

The support strut 24 has a jet flap discharge slot 44 which is spaced slightly from the trailing edge 45 of the strut so that the slot is on the side of the strut, thereby turning the air at an angle to the direction of the air flow drawn into the compressor 14, thereby providing a jet flap.

The embodiments of different jet flap slots 44 and the construction of the strut 24 are shown in FIGS. 2 and 3. In FIG. 2, which is the simplest form of construction, the support struts 24 are hollow and have walls 46 and 48 defining a sideways discharge slot 44 formed near the edge at the trailing end 45 of the strut 24 shown in FIG. 2.

In FIG. 3, a new strut construction is formed when cast, wherein the inner part of the strut 24 is also left hollow. A curved deflection member 56 is provided intermediate the opening 53 formed at the trailing end of the strut 24. A constricting lip 58 is also provided between concave surface of the deflecting member 56 and the respective wall 54 of the strut 24. The deflecting member 56 will cause a deflection of the air sideways to form the jet flap, but will reduce the turbulence behind the outlet of the slot by allowing healthy air flow about the convex side of the deflecting member 56. Such flow will be close to the same velocity as the air discharging from the slot 44, thereby preventing losses by way of turbulent mixing along the edge of the strut 24.

It is known that because of higher pressure ratio in modern and future compressors, difficulties are encountered in attaining engine stability at low power modes. There is a limit as to the amount of increased stability one can obtain by simply bleeding interstage air from the compressor overboard. Furthermore, approximately 30% of the power transmitted to the compressor is wasted since the partially compressed air is bled and thrown overboard. It has been found in tests that by providing jet flaps at the trailing edge of the struts 24 which essentially create a swirl in the air drawn into the compressor in the same direction as the rotation of rotor blades 26, that part of the air bled from the interstage of the compressor, which has energy in terms of pressure, can be redirected through hollow struts 24, and there is still enough energy left in the air as it is discharged from the slots 44 to provide jet flaps to cause the pre-swirl. In actual tests which have been made, it has been noted that, even though only one third of the original amount of interstage bleed air is discharged as a jet flap, and even in the light of inevitable pressure losses during the transfer of this air from the plenum to the discharge slot 44, there is still sufficient energy remaining which is useful for the purposes mentioned above.

Referring to FIG. 4 of the drawings, there is shown a comparison of area of stable operation when using a straight interstage bleed-off where the air is discharged overboard (in dotted lines) as compared with the area of stable performance when the bleed air is recirculated to the struts 24 to provide pre-swirl (shown in full lines). In the graph, the curves are represented as follows:

Lines R and $R_1$ represent a typical operating line;

Curves S and $S_1$ represent limits for stable compressor operation;

Lines N and $N_1$ represent constant compressor speed.

The normal stable operating ranges are usually described by the area between lines R and S and $R_1$ and $S_1$. The most critical is usually the speed range up to 75% of the maximum reference speed illustrated in the graph. It can be seen that the stable range $R_1$, $S_1$ for the case of bleed air induced pre-swirl has been increased. The shift of the typical operating line R to $R_1$ towards lower flow ratios is indicative of the reduction of overboard spillage. The lower left end of the ranges shown in FIG. 4 represent approximately the operating point at idle power. It can be seen from the graph that the provision of the pre-swirl using bleed air causes the engine to idle at about 10% higher compressor speeds which will reflect beneficially on the time required for accelerating the engine from idle to maximum power.

We claim:

1. An apparatus for providing an induced pre-swirl at the compressor inlet of a turbine engine comprising a multi-stage compressor, a housing for the compressor, bleed ports provided in the compressor housing interstage of the compressor, a plenum chamber in which the bleed air from the bleed ports is collected, control valve means for selectively passing the bleed air to a plurality of hollow vanes provided in the inlet of the compressor, each of the hollow vanes being connected to the control valve means by conduit means, each vane having a slot provided near the trailing edge of the vane and parallel with the trailing edge, a curved aerodynamic deflector having a concave surface and a convex surface in the slot for deflecting a major portion of the bleed air at an angle to the direction of air flow, a discharge opening being provided on the convex side of the deflector to allow attached flow about the deflector.

* * * * *